(12) United States Patent
Russell et al.

(10) Patent No.: US 11,405,408 B2
(45) Date of Patent: Aug. 2, 2022

(54) METHOD, APPARATUS AND COMPUTER PROGRAM FOR VERIFYING THE INTEGRITY OF ELECTRONIC MESSAGES

(71) Applicant: IPCO 2012 LIMITED, London (GB)

(72) Inventors: Clifford Norman Russell, Camberley (GB); Julian Robert Mark Barnes, Watford (GB)

(73) Assignee: IPCO 2012 LIMITED, London (GB)

( * ) Notice: Subject to any disclaimer, the term of this patent is extended or adjusted under 35 U.S.C. 154(b) by 198 days.

(21) Appl. No.: 16/828,598

(22) Filed: Mar. 24, 2020

(65) Prior Publication Data
US 2020/0314112 A1 Oct. 1, 2020

(30) Foreign Application Priority Data
Mar. 25, 2019 (EP) .................................... 19164944

(51) Int. Cl.
*H04L 9/40* (2022.01)
*G06Q 20/16* (2012.01)

(52) U.S. Cl.
CPC .......... *H04L 63/123* (2013.01); *G06Q 20/16* (2013.01)

(58) Field of Classification Search
CPC ... H04L 63/123; H04L 9/3239; H04L 9/0643; G06Q 20/16; G06Q 10/107
See application file for complete search history.

(56) References Cited

U.S. PATENT DOCUMENTS 6,523,115 B1 * 2/2003 Ono ...................... H04L 9/0643
 713/168
7,308,578 B2 * 12/2007 Keohane ................. G06F 21/33
 713/175

(Continued)

FOREIGN PATENT DOCUMENTS

WO 02/11025 A2 2/2002
WO 02/19069 A2 3/2002

OTHER PUBLICATIONS

N. Živić and O. Rehman, "On using the message digest for error correction in wireless communication networks," 2010 IEEE 21st International Symposium on Personal, Indoorand Mobile Radio Communications Workshops, 2010, pp. 491-495, doi: 10.1109/PIMRCW.2010.5670523. (Year: 2010).*

(Continued)

*Primary Examiner* — Jeremy S Duffield
*Assistant Examiner* — Sameera Wickramasuriya
(74) *Attorney, Agent, or Firm* — Talem IP Law, LLP (57) ABSTRACT

A method for verifying integrity of electronic messages, comprising the steps of: obtaining an input message digest for a source electronic message; adding the input message digest to an input accumulator that accumulates the input message digests over a predetermined period of time; obtaining an output message digest for a destination electronic message; adding the output message digest to an output accumulator that accumulates the output message digests over the predetermined period of time; comparing the value of the input accumulator with the value of the output accumulator at the expiration of the predetermined period of time; and verifying integrity in the source and destination electronic messages over the predetermined period of time when the value of the input accumulator is equivalent to the value of the output accumulator.

15 Claims, 8 Drawing Sheets

(56) References Cited

U.S. PATENT DOCUMENTS

| | | | | |
|---|---|---|---|---|
| 7,672,005 B1* | 3/2010 | Hobbs | H04N 1/41 | |
| | | | 358/1.15 | |
| 8,452,880 B2* | 5/2013 | Jain | G06Q 10/107 | |
| | | | 709/229 | |
| 8,732,044 B2* | 5/2014 | Lovelett | G06Q 20/102 | |
| | | | 705/35 | |
| 9,443,108 B1* | 9/2016 | Roth | H04L 9/3239 | |
| 9,866,390 B2* | 1/2018 | Chen | H04L 9/3242 | |
| 10,044,583 B2* | 8/2018 | Kim | H04L 43/028 | |
| 2004/0064515 A1* | 4/2004 | Hockey | G06F 21/566 | |
| | | | 709/206 | |
| 2005/0177495 A1* | 8/2005 | Crosson Smith | G06Q 20/02 | |
| | | | 705/39 | |
| 2006/0212711 A1* | 9/2006 | Tanimoto | H04N 1/42 | |
| | | | 713/178 | |
| 2007/0174402 A1* | 7/2007 | Tomkow | H04L 51/00 | |
| | | | 709/206 | |
| 2009/0019547 A1* | 1/2009 | Palliyil | H04L 63/145 | |
| | | | 726/25 | |
| 2014/0218191 A1* | 8/2014 | Hollender | G06F 16/00 | |
| | | | 340/506 | |
| 2014/0298037 A1* | 10/2014 | Xiao | H04W 4/70 | |
| | | | 713/181 | |
| 2017/0046514 A1* | 2/2017 | Henry | G06F 21/572 | |
| 2018/0101530 A1* | 4/2018 | Brown | G06F 13/28 | |
| 2019/0268153 A1* | 8/2019 | Kurian | H04L 9/3239 | |

OTHER PUBLICATIONS

J. Zhang, X. Liu and J. Wang, "A scalable message authentication scheme for JPEG2000 codestreams," 2010 5th International Conference on Computer Science & Education, 2010, pp. 1727-1729, doi: 10.1109/ICCSE.2010.5593572. (Year: 2010).*

Extended European Search Report issued in EP Application No. 19164944.1, dated Jun. 26, 2019, 8 pages.

* cited by examiner

METHOD, APPARATUS AND COMPUTER PROGRAM FOR VERIFYING THE INTEGRITY OF ELECTRONIC MESSAGES

TECHNICAL FIELD

The present invention relates to a method, apparatus and computer program for verifying the integrity of electronic messages.

BACKGROUND

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

Electronic systems that handle electronic messages (such as payment systems) come in many forms. While each may be distinct, they also share much in common. One important part of such an electronic system is assurance that instructions contained within the electronic messages are faithfully executed.

Electronic systems that focus on speed and volume often do so by making assumptions that the instructions contained in the electronic messages will be correctly processed. However technical, logical or criminal factors may prevent such processing from occurring as intended by, for example, tampering with the electronic message and any instructions contained therein.

It is desirable to therefore verify that the electronic message at the output of such a system corresponds to the electronic message at the input to such a system. In this way, the electronic system is assured that the electronic message (and any instructions contained therein) will be correctly processed.

It is also desirable to ensure the privacy of the electronic message whilst validating the electronic message at the output of the system.

It is an aim of embodiments of the disclosure to address at least one of these problems.

BRIEF SUMMARY

An aspect of the disclosure is a method for verifying integrity of electronic messages, comprising the steps of: obtaining an input message digest for a source electronic message; adding the input message digest to an input accumulator that accumulates the input message digests over a predetermined period of time; obtaining an output message digest for a destination electronic message; adding the output message digest to an output accumulator that accumulates the output message digests over the predetermined period of time; comparing the value of the input accumulator with the value of the output accumulator at the expiration of the predetermined period of time; and verifying integrity in the source and destination electronic messages over the predetermined period of time when the value of the input accumulator is equivalent to the value of the output accumulator.

This verifies the output (destination) electronic message from the system corresponds to the input (source) electronic message to the system quickly and with privacy.

Other embodiments may be provided in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Referring now to the drawings, wherein like reference numerals designate identical or corresponding parts throughout the several views.

Figure 1:
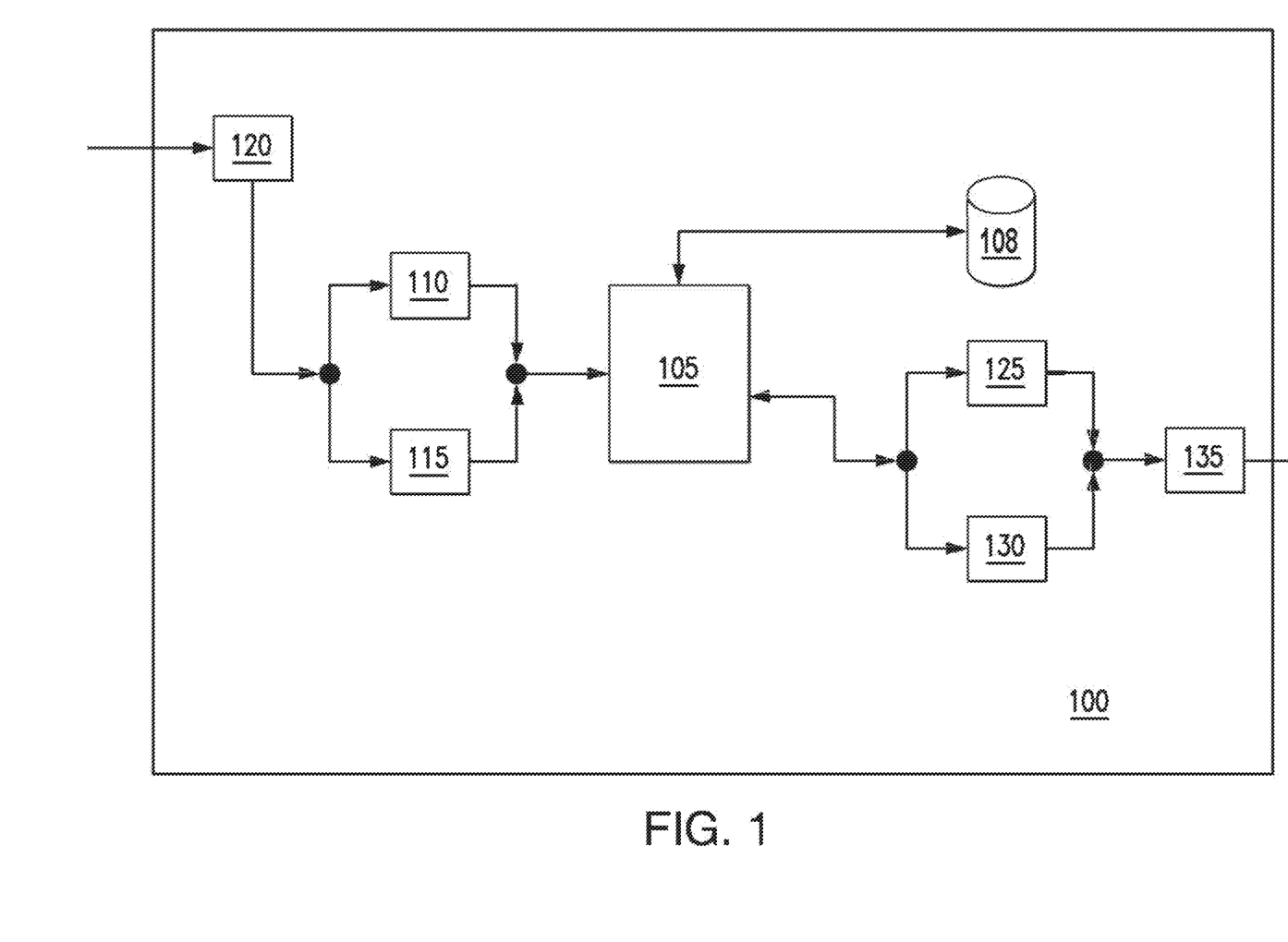
FIG. 1 describes an apparatus according to embodiments of the disclosure.

FIG. 1 shows an apparatus 100 according to embodiments of the disclosure. The apparatus 100 includes control circuitry 105 which is configured to perform a method according to embodiments of the disclosure. The control circuitry 105 may be Application Specific Integrated Circuitry or any kind of circuitry that is configured to perform a method according to embodiments. The control circuitry 105 is however, in embodiments, a microprocessor that is circuitry configured to operate according to computer readable instructions. These computer readable instructions are software that configures the control circuitry 105 to perform a method according to embodiments of the disclosure. The software is stored in storage 108. Storage 108 is connected to control circuitry 105 and is embodied as a computer readable storage medium which may be solid-state storage, magnetically or optically readable storage or the like.

The control circuitry 105 is connected to an input accumulator 110 and an output accumulator 125. The input accumulator 110 and/or the output accumulator 125 may be embodied as separate to the control circuitry 105 (as shown in FIG. 1) or may be integrated into, or form part of, the control circuitry 105. Of course the function of the input accumulator 110 and/or the output accumulator 125 may be performed by the computer readable instructions as would be appreciated.

The input accumulator 110 and the output accumulator 125 are multi-byte accumulators. Accumulators are known and store the results of arithmetic. In this case, the input accumulator 110 and/or the output accumulator 125 store the results of addition. In other words, the output accumulator 125 performs mathematical operations which monitor the state of the system. This will be explained later.

Additionally connected to the control circuitry 105 are an input counter 115 and an output counter 130. The input counter 115 and/or the output counter 130 may be embodied as separate to the control circuitry 105 (as shown in FIG. 1) or may be integrated into, or form part of, the control circuitry 105. Of course the function of the input counter 115 and/or the output counter 130 may be performed by the computer readable instructions as would be appreciated.

The function of the input counter 115 and the output counter 130 will be described later.

Connected to the input accumulator 110 and the input counter 115 is input communication circuitry 120. The input communication circuitry 120 is circuitry configured to receive an input message digest. Connected to the output accumulator 125 and output counter 130 is output communication circuitry 135. The output communication circuitry 135 is circuitry configured to receive an output message digest. The input message digest and the output message digest may be provided over a network. This will be explained later.

In electronic systems, electronic messages are passed from a source to a destination. In many instances, the electronic message is passed via an intermediary processing device. The processing device therefore receives the message from the source (sometimes referred to as the "source electronic message"), processes the electronic message according to instructions included within the electronic message and then passes the electronic message to a destination (sometimes referred to as the "destination electronic message"). According to embodiments of the disclosure, it is desirable to verify the integrity of the electronic message entering the processing device and leaving the processing device. In other words, it is desirable to verify that the electronic message entering the processing device is the same as (or at least equivalent to) the electronic message leaving the processing device. This is particularly useful in the context of electronic transactions especially in financial institutions.

Typically, electronic payment systems connect holders of accounts with each other and allow for the transfer of value between those accounts. The unit of account is typically fiat money, but can also be many other asset classes. Account holders typically have accounts provided to them by financial institutions, although other classes of institution exist according to the market being served. For the purposes of the following, the term bank or financial institution should be interpreted as any account holding scheme, organisation or body.

Account Holders make payments either through credits, in which they push money to a receiving account, or through debits, in which an authorised party may take money from an account. These payments are arranged using electronic messages. Electronic messages flow from parties to orchestrate the flow of the payment and these messages are facilitated typically by a Central Infrastructure (which is one example of the processing device mentioned above) such as the Faster Payments infrastructure, although other models also exist such as bi-lateral settlement or distributed ledger.

The customers of sending financial institutions (the sources) are sending payments (which may be either credits, or responses to debit requests). The accounts held at the receiving banks (the destinations) will as a result have their available balances updated in accordance with the rules of the respective payment scheme in response to the messages processed by the payment system. This process is known in finance as "Payment Clearing".

An important subsequent process happens following clearing, this is known as "Payment Settlement" in which value is ultimately transferred and any risks arising during clearing ultimately resolve themselves.

The following explanation focuses on clearing, but the ability to pass the information it generates from the clearing system to the settlement system is also beneficial as will be explained later on.

Methods do exist for ensuring that payment messages (or any other messages) that are sent are actually received. This applies for physical messages and assets, and for computer based messages. This property in computer networking is known as "Reliability" or "Assurance". A reliable or assured protocol provides information to the sender with regards to the ultimate delivery of the transmitted message. Reliable protocols however incur more overhead than unreliable protocols, and as a result, tend to be less scalable. Payment Systems operating in such modes may also combine payment with settlement, and are called "Real Time Gross Settlement" or RTGS systems. These systems do exist, but are typically used for high value low volume payment systems.

The problem of the additional overheads in fully reliable systems is that the overheads of providing the delivery information can adversely affect the overall technical performance of the system, such as network capacity and data storage. This problem exists in electronic systems and networks in general and is not specific to payment systems.

As such, in an example mass retail payment system, these operate on the principle that it is the ultimate delivery that matters and on the whole, they are able to operate much faster as a result. However, in these unreliable systems, there is no facility to check that the message has arrived safely.

This problem is exacerbated as the message sent from the source may be changed or processed en-route meaning that the content of the message may have changed. Although this may happen in any system where electronic messages are passed around a network, in the field of payment systems where the electronic message relates to payments, it is necessary to adopt a number of additional functions. These include, but are not limited to:

Redirection of payments during clearing;

The storage of payments until a particular time or event has occurred before clearing occurs;

The insertion or addition of payment instructions to balance the debits and credits in a file and to facilitate settlement;

Deletions

Amendments.

Translations and Transformations (input and output formats may be different and the systems carrying the messages through the payment system may use different message syntax). Also batch payment systems accept inputs of batches, sort and process these and produce batches of payment instructions on the output side).

The impact of such actions being incorrectly processed is potentially significant.

It is therefore desirable to verify that the total number of electronic messages sent from one or more sources correspond to the total number of electronic messages that arrive at one or more destinations.

It is also desirable to verify this even when the content of the message changes. This is for example when the electronic message contains a payment instruction (or some other kind of instruction) that is changed or modified during processing. It is also the case with batch files sent from a source, where the electronic message contains a plurality of payment instructions which may be split up during processing and then re-consolidated for delivery to the destination.

Figure 2:
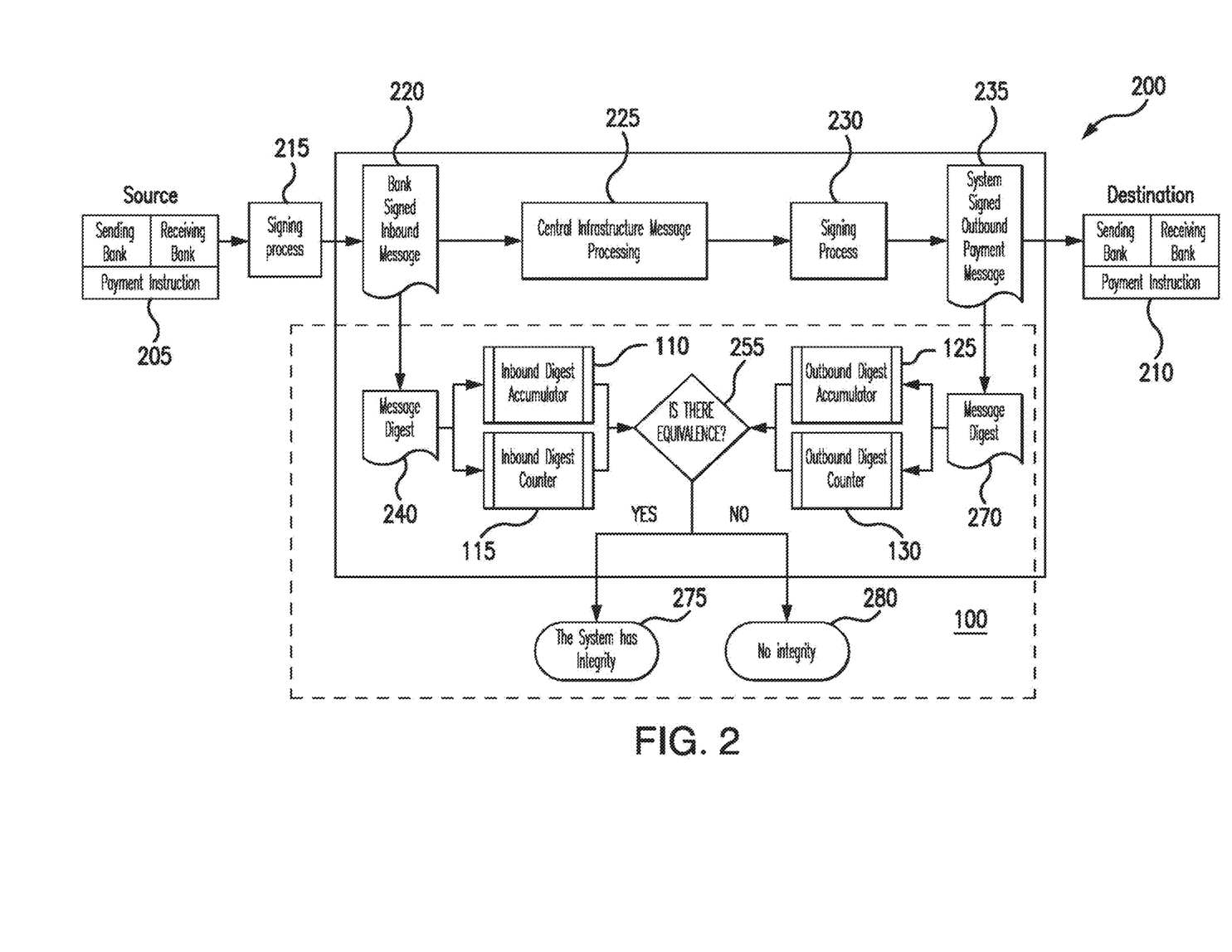
FIG. 2 describes a system in which the apparatus of FIG. 1 is located.

Referring to FIG. 2 embodiments of the disclosure will now be described.

A source generates a source electronic message 205. Although only a single source electronic message is shown, the disclosure is not so limited and any number of source electronic messages is envisaged.

In the example, the source electronic message 205 is a payment instruction. The payment instruction includes sending bank information (such as a sort-code, name, account number and the like) and destination bank information (such as a sort-code, name, account number and the like). The payment instruction may also include payment information such as date of payment and the amount of payment as would be appreciated. More generally, the source electronic message will include any information that is to be transferred to a destination as well as an identifier for the destination so that the source electronic message may be delivered to the destination.

The source electronic message 205 is sent from the source to a signing mechanism in step 215. The signing mechanism 215 applies an electronic signature to the source electronic message 205. The signing mechanism 215 may apply any kind of electronic signature to the source electronic message 205 which may adhere to the NIST-DSS, XAdES or PAdES standards.

The signed source electronic message is then passed to step 225 where the signed source electronic message is passed to a processing device. In this embodiment, the processing device is a central infrastructure message processing device such as FasterPayments or the like.

In addition, the signed source electronic message is passed from step 220 to step 240. In step 240, a source message digest is produced. In other words, as the source electronic message 205 is passed to the processing device, a message digest is produced. The message digest may be produced by apparatus 100 as is shown in FIG. 2 or may be produced elsewhere, such as by a different provider. In the instance that the message digest is produced by the apparatus 100, the source electronic message is received at the input communication circuitry 120, and step 240 is carried out by processing circuitry 105. Alternatively, if the message digest is produced elsewhere, the message digest is received by the input communication circuitry 120. In either case, the apparatus 100 obtains the message digest of the source electronic message.

The Digest

There are many standards for producing message digests. However, in embodiments, it is useful that the chosen message digest standard has a high digest collision resistance. In other words, it is useful that the message digest standard produces message digests where the chance of digest collision (i.e. two different messages producing the same message digest) is low. Indeed, it is desirable to have the probability of digest collision substantially zero.

Another desirable property of a chosen digest generation standard is that generated digests are likely to be numerically massively different. Even a small change in the message should (with overwhelming probability) result in a mostly different hash, due to a property known as the "avalanche effect".

It will become apparent the usefulness of these features later.

One message digest standard that has these desirable properties and is thus particularly useful is SHA-2 256. Of course, other digest standards are appropriate as would be appreciated.

Achieving Low Collision and Usefulness of the Digest

Digests must be produced from relevant significant payment information. This is the data relevant to the payment that exists with both the source and the destination of the payment instruction. The inclusion of all significant data in the signed electronic message ensures that the signed electronic message is able to prove that all significant data persisted from end to end and the message was not modified unintentionally or maliciously in transit.

There are deployment models in which the message digest may be produced by the source, or created upon entry into the processing device or publication to a distributed system. Where these are deployed at the processing device, data that is assigned for the processing of a payment through a processing device may also be used, even though it is not persisted through to the ultimate destination as long as the outbound digests are produced before the electronic messages leave the processing device.

In many instances, electronic messages such as payment instructions themselves are prone to repeat patterns. For example, in the context of payment instructions, a standard amount of money may often move between the same accounts on a regular basis.

As such, it is useful to include a unique identifier in the input to the digest calculation. In embodiments, the unique identifier may be a time and/or date (having a high resolution for example milliseconds); or any other kind of unique identifier. One further example of a unique identifier is a unique identifier assigned by the processing device.

By including a unique identifier to the electronic message, the impact of repeat patterns, and thus the likelihood of a digest collision are reduced. In other words, a unique identifier assigned by the source along with all significant payment data increases the likelihood of unique and mathematically diverse digests being produced. This likelihood is further increased if the digest standard is SHA2-256

Further, if a unique identifier is assigned to each source electronic message, end to end delivery can be guaranteed and uniqueness ensures that false positives are highly unlikely. Further, by including all of the significant data in the digest calculation, the verification will also ensure that false positives are highly unlikely in the event of corruption of payment data during processing/transmission as will become apparent.

Producing Digests from Batch Files

As noted above, it is possible that the source electronic message is a batch file. That is, the source electronic message may include a plurality of payment files. The processing of batches of payment files to create the digests is different to that for single payment messages. A batch file will tend to have just one signature that envelopes a number of payment files or instructions. However, the batch is deconstructed by the processing device (or distributed smart-processing/contracts system) and reconstituted into a destination electronic message. Typically the destination electronic message will contain the consolidated payment instructions assembled from a plurality of submitters. The source electronic message and destination electronic message only typically match on a transaction line basis.

As such, it is not possible to use the message digest produced for the source message in the destination message. With payment instructions (which are typically XML documents), streaming parsers can be used on batch files which represent an XML document as stream of events like "payment-start-element", "payment-end-element", "source account", "destination account", "amount", "reference" etc. A document subset can also be represented as a stream of events. A digest is then produced for each event as it parses a batch file.

After the message digest has been produced in step 240, the source message digest is passed to the input accumulator 110 and the input counter 115.

The input accumulator 110 is a long multi-byte accumulator. The input accumulator 110 takes a copy of each message digest and adds this to the existing total. In other words, the input accumulator 110 keeps a running total of the value of the message digests received over a predetermined period of time. That is, the input accumulator 110 operates as a hexadecimal calculator summing the message digests received over the predetermined period of time. For example, if the message digests were $8AB_H$ and $B78_H$, then the value stored on the input accumulator 110 would be $1423_H$. Then if a further message digest of 2BC arrived, the value stored on the input accumulator 110 would be 16DFH. Obviously, as would be apparent, this is a simplified example as will be explained later.

The size of the input accumulator 110 should be large enough to cope with all the message digests received over a predetermined period such as one day plus a margin of error. As noted above, it is desirable that the hashing algorithm used is SHA-2 256, then an example of the message digest produced in this case for a single space character input is:
e3b0c44298fc1c149afbf4c8996fb92427ae41e4649b934ca495991b7852b855

This is encoded in hexadecimal and can be represented in 256 bits of information. SHA-2 256 digests are always this length regardless of input. The total size of the input accumulator 110 is thus this length, plus additional bits required to allow for the maximum number of message digests in the predetermined period.

As an example, if the input accumulator 110 has a size of 288 bits. The first 256 bits are required to hold the input message digest. Upon addition, a maximum possible 1 is carried forwards into the remaining 32 bits. The 32 bit portion of the input accumulator allows up 232 values, which is 4,294,967,296 payment hashes.

As noted above, the input counter 115 is a counter that counts the number of digest messages during the predetermined period of time. The operation of this will become apparent later.

Returning to FIG. 2, after the signed source electronic message is processed by the processing device 225 which, in embodiments, is the central infrastructure processor, a destination electronic message is generated. This is the electronic message which is to be passed to the ultimate destination. The destination electronic message is passed to step 230 where the destination electronic message is signed. This is the same process as described above in respect of step 215. Although the foregoing shows a single destination electronic message, the disclosure is not so limited and any number of destination electronic messages is envisaged.

The signed destination electronic message is passed to step 235 where, in a similar manner to step 220, the signed destination electronic message has a message digest produced. This message digest is produced in step 270. At the same time, the signed destination electronic message is passed to the destination which is, in embodiments, a destination financial institution.

Returning to step 270, an output message digest is produced for the signed destination electronic message. The process for the production of the message digest for the signed destination electronic message is the same as that described for the source electronic message in step 240.

After the message digest has been produced in step 270, the output message digest is passed to the output accumulator 125 and the output counter 130. The function of the output accumulator 125 is the same as the function of the input accumulator 110 and the function of the output counter 130 is the same as the function of the input counter 115 and so will not be described any further for brevity.

As will be apparent, where the signed source electronic message and the signed destination electronic message are the same, the value of the input message digest generated at step 240 and the output message digest generated at step 270 will be the same. Accordingly, at any point during the predetermined time period, the values held in the input accumulator 110 and the output accumulator 125 will be the same or at least equivalent. In other words, the values held in the input accumulator 110 and the output accumulator 125 are the same or at least equivalent; equivalent in this instance meaning that with a mathematical operation they will be the same. An example of an equivalent value is 3+2=4+1 whereas an example of the same value is 3=3. Therefore, a check is provided in step 255 that compares the value in the input accumulator 110 with the value stored in the output accumulator 125.

In the event that the values are the same, the process moves to step 275 where it is verified that no corruption has occurred. In other words, it is verified that the number and content of the signed input message and the signed output message is the same. Alternatively, if the values are not the same, the process moved to step 280 where it verified that corruption has occurred. This provides a mechanism for quick verification that no message corruption (that is, loss of a message or damage to a message) has occurred.

If the value of the input counter 115 and the output counter 130 match (or are not checked) and the value of the input accumulator 110 and the output accumulator 125 do not match, then message corruption has occurred. If the value of the input counter 115 and the output counter 130 also do not match, then message loss has occurred. If the difference between the input counter 115 and the output counter 130 is "1", then the difference between the input accumulator 110 and the output accumulator 125 is equal to the message digest of the lost message.

This mechanism is particularly high speed as the processing overhead associated with operating accumulators and counters in computing terms is trivial. Computers perform almost all operations modified forms of addition and the size of the accumulator and counters is small.

In limited circumstances, if there are some discrepancies, the processing device can deduce the nature of the discrepancy to provide clues for auditors to investigate. For example, if only one transaction was affected and lost—the difference between the input and the output registers would be equal to the hash of the message that failed to pass through the system. However, in the event that multiple messages were lost, if by chance the sum of their hashes were low, then it is possible to remove all candidate transactions from the pool that had a hash value lower than the combination of the difference minus the lowest observed hash. This reduces the number of transactions to inspect and thus reduces the amount of processing resource required to investigate the discrepancy.

In the instance that multiple hashes are missing, the use of a leading significant digit used as a counter appended to the generated hash would allow the number of messages that failed to pass through the system to be calculated. For example, in the event that the Input Register Value is 000123000019863826939 and a counter of "1" was added to increment the first six digits—i.e. the individual transaction hash is 1000019863826939 where the first "1" is material in incrementing the first six digits; and the output hash is 000120000019863241939—the difference in the first six digits is 3. This identifies that three transactions were lost. The value of the hash to the right (000019863241939) is merely confirming the loss and has no intrinsic meaning. If the Input value was 000123000019863826939 and the output value was 000123000019863888888—then because the first six digits are identical, but the smaller compound hash value is different, this suggests that the correct number of records has been processed but corruption has occurred.

Figure 3:
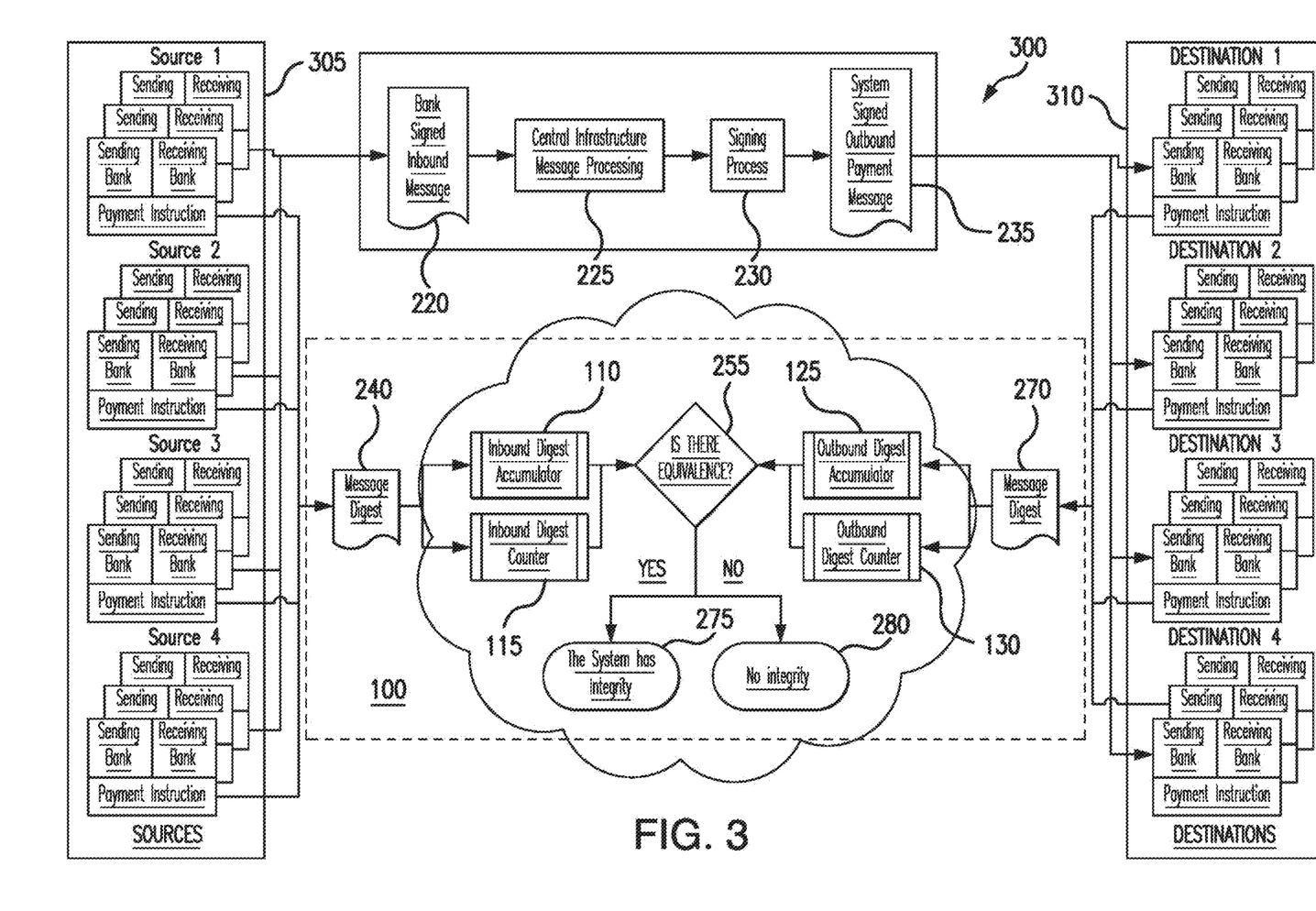
FIG. 3 describes a distributed system including the apparatus of FIG. 1.

Referring to FIG. 3 distributed embodiments of the disclosure are shown. Specifically, a distributed version 300 of the system of FIG. 2 is shown. In the explanation of FIG. 3, like reference numerals will refer to like features and so will not be described in detail for brevity.

Firstly, in FIG. 2 a single source and destination is shown. However, in the system 300 of FIG. 3, a plurality of sources 305 are shown. Specifically a first source (source 1), a second source (source 2), a third source (source 3) and a fourth source (source 4) are shown. Each source produces a plurality of source electronic messages. However, the disclosure is not so limited and a single source electronic message may be produced.

Similarly, in FIG. 3, a plurality of destinations 310 are shown. Specifically, a first destination (destination 1), a second destination (destination 2), a third destination (destination 4) and a fourth destination (destination 4) are shown. Each destination receives a plurality of destination electronic messages. However, the disclosure is not so limited and a single destination electronic message may be received.

As will be apparent, the main difference between the system of FIG. 2 and the system of FIG. 3 is that the functionality of apparatus 100 is decoupled from the functionality of the processing device. Specifically, the functionality of apparatus is placed on the cloud. This allows the source digest to be submitted using an Application Programming Interface (API). Additionally, in the system of FIG. 3, the processing of the hashes will have no effect on the processing device. Moreover, as the content of the source electronic message cannot be derived from the hash, there is no risk of a data leak.

With both the system of FIG. 2 and FIG. 3, electronic messages from any source may be provided. However, in the embodiments 400 of FIG. 4, source electronic messages from participating sources and destination electronic messages from participating destinations only will be allowed to place input digests and output digests onto the apparatus 100. This allows a charge to be levied or access provided to sources and destinations that meet certain security criteria. This will be now described.

Figure 4:
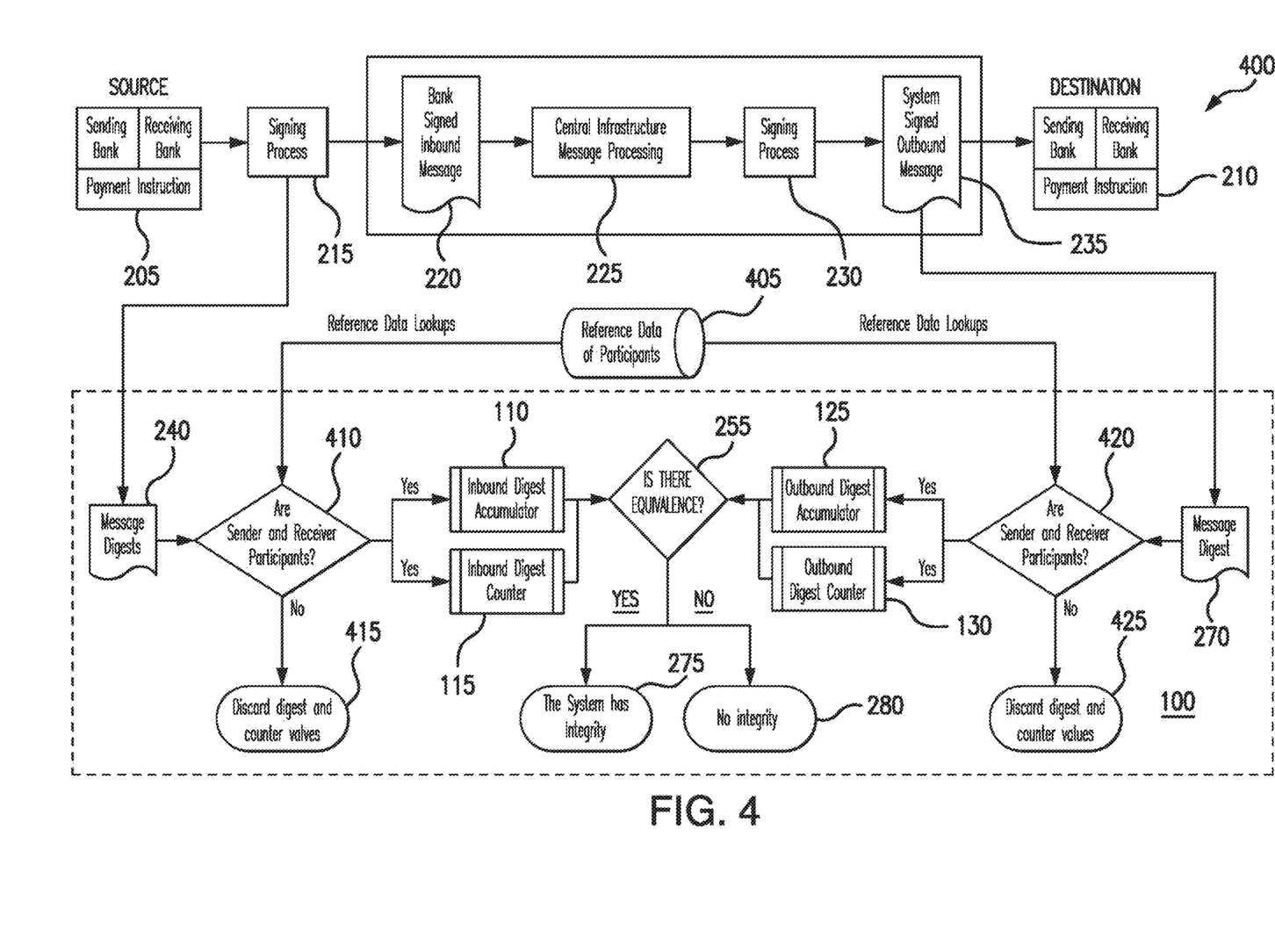
FIG. 4 describes another system in which the apparatus of FIG. 1 is located.

The process 400 of FIG. 4 is based on the process described with reference to FIG. 2. For brevity, like reference numerals refer to like features and so will not be described in any further detail.

Once the source digest message has been produced in step 240, the source digest message is passed to step 410 where a check is carried out to determine if the source of the electronic message and the destination of the electronic message are participants of the scheme. In order to establish this, a check is performed on a database 405 containing details of the source of the electronic message and the destination of the electronic message. This is possible because the original inputs are still available until the hash is applied. Therefore, inspection of the original inputs allows a decision to be made about applying the hash on the accumulator on a transaction by transaction basis.

If the source of the electronic message and the destination of the electronic message are participants of the scheme, the "yes" path is followed to place the input message digest on the input accumulator 110 and the input counter 115 as explained with reference to FIG. 2. On the other hand, if either the source of the electronic message or the destination of the electronic message are not participants of the scheme, the "no" path is followed to step 415 where the input message digest is discarded so the input accumulator 110 and the input counter 115 are not presented with the input message digest.

Similarly, where the output message digest is obtained in step 270, the destination message digest is passed to step 420. In step 420 a check is carried out to determine if the source of the electronic message and the destination of the electronic message are participants of the scheme. In order to establish this, a check is performed on the database 405 containing details of the source of the electronic message and the destination of the electronic message.

If the source of the electronic message and the destination of the electronic message are participants of the scheme, the "yes" path is followed to place the output message digest on the output accumulator 125 and the output counter 130 as explained with reference to FIG. 2. On the other hand, if either the source of the electronic message or the destination of the electronic message are not participants of the scheme, the "no" path is followed to step 425 where the output message digest is discarded so the output accumulator 125 and the output counter 130 are not presented with the output message digest.

Figure 5:
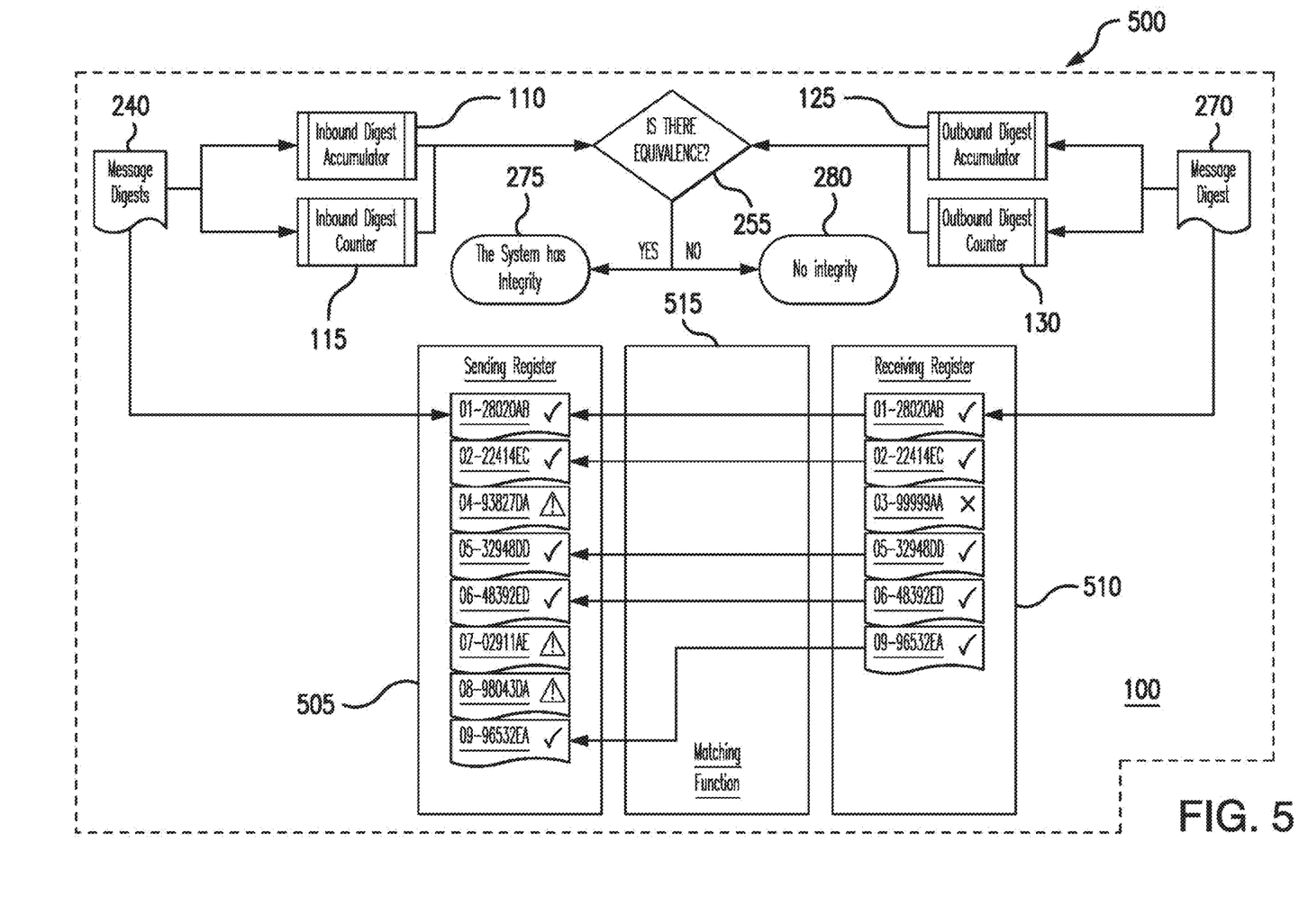
FIG. 5 describes an apparatus of FIG. 1 that allows the point of failure to be identified.

Referring to FIG. 5, embodiments 500 of the disclosure are shown that allows the point of failure to be identified. For brevity, FIG. 5 is based on FIG. 2 where like numerals refer to like features. Once the input message digest 240 is obtained in the apparatus 100, the input message digest is passed to the input accumulator 110 and the input counter 115. Unlike FIG. 2, however, the input message digest 240 is additionally passed to an input register 505. The input register 505 stores the input message digest 240. A sequence counter may be provided so that the input register 505 stores the input message digests 240 in the order in which they are received. This assists in sorting and indexing the input message digests. Of course, the disclosure is not so limited and the provision of the sequence counter is optional.

For example, in the input register 505 there is no number 3 digest. This may be of significance indicating a fault on the source side, or a deletion. The inclusion of date and time may also be useful for calculating Service Level Agreements. Data items added may also aid in the creation and management of the registers as they can form part of the indexing and matching function and facilitate performance.

Further, once the output message digest 270 is obtained in the apparatus 100, the output message digest is passed to the output accumulator 125 and the output counter 130. Unlike FIG. 2, however, the output message digest 270 is additionally passed to an output register 510. The output register 510 stores the output message digest 270. A sequence counter may be provided so that the output register 510 stores the output message digests 270 in the order in which they are received. This assists in sorting and indexing the output message digests. Of course, the disclosure is not so limited and the provision of the sequence counter is optional.

In embodiments of the disclosure, input message digests persist in the input register 505 until their concomitant entry appears in the output register 510. This matching of the input message digests in the input register 505 with the output message digests 270 in the output register 510 is carried out by the matching function 515. The input register 505 and output register 510 will be located within storage 108 and the matching function 515 will be performed by the processing circuitry 105 in embodiments.

In FIG. 5 there is a register entry in the output register 510 which has no concomitant value in the input register 505 (the third register entry from the top). This is an error condition. When an error condition is established, it is useful to highlight this entry. This highlight may be a visual highlight or may be a highlight to the processing device which indicates an error condition so this may be investigated.

As noted above, in embodiments, it is also desirable to provide a sequence counter (which will be embodied as a function performed by the processing circuitry 105). Due to this, as the fourth register entry from the top has a concomitant entry in the input register 505, the error can be even more quickly identified. Accordingly, the highlighted erroneous register entry, and the destination electronic message to which it pertains can be subjected to remedial measures which are outside the scope of the disclosure.

Of course, although the above describes highlighting a register entry in the output register, the disclosure is not so limited and an erroneous entry in the input register may also be highlighted if no corresponding match is found in the output register.

A number of input message digests in the input register 505 have yet to be matched to output message digests in the output register 510. These have the warning triangle. This indicates that the matching function 515 has yet to match an input message digest with the concomitant output message digest. This may be due to latency in the processing device.

At the end of the predetermined period of time, or after a different period defined in a service level agreement has expired, the reconciliation of both the input register 505 and the output register 510 occurs and database maintenance can ensue. Storage of digests for longer periods may also an option and desirable depending on the architectural constraints.

Additionally, the sum of the source message digests in the input accumulator 110 and the destination message digests in the output accumulator 125 at a given time can be compared to the sum of the successfully matched digests in the input register 505 and the output register 510 at a given time. This allows for a grace period for Service Level Agreement compliance to be achieved. Moreover, due to this balance, it is quickly established that all source electronic messages and destination electronic messages up to that point in time were correctly processed.

Further, once matched, source message digests and destination message digests can be removed from the input register 505 and output register 510 if only system integrity is to be proved. This reduces the size of the input register 505 and the output register 510.

In general, payment instructions enter a processing device, are processed and exit. In other words, the source electronic message is passed to the processing device, the processing device processes the source electronic message and sends a destination electronic message. This processing regime, whilst embodied as a payment instruction, is not limited to financial services and can apply to any type of electronic message carrying data.

The above mechanisms have assumed that the source electronic message and the destination electronic message are the same. However, this is not always the case as the processing device may perform certain operations on the data meaning that the source electronic message and the destination electronic message are different. The following embodiments describe mechanisms to ensure integrity even if the processing device performs operations on the data meaning that the source electronic message and the destination electronic message are different.

In the field of payments, there are a number of classes of extraordinary payment paths. These are:
Redirection of payment instructions during clearing;
The storage of payment instructions until a particular time or event has occurred before clearing occurs;
The manual insertion or addition of payment instructions to balance the debits and credits in a file and to facilitate settlement;
Splitting of payment instructions in flight
Deletions
Amendments/Corrections.
Translations and Transformations Therefore, the details of payments leaving the processing device may differ from those entering the processing device. Thus simply storing the input message digests and the output message digests in the input and output accumulators will not work in this instance.

In general, to address this problem, an additional accumulator is provided for each of the above extraordinary payment paths. This means that an electronic message containing a payment that follows one of the above extraordinary payment paths has its digest stored in the input accumulator 110, the output accumulator 125 (at the appropriate time) and the additional accumulator specific to the extraordinary payment path. This will be explained in more detail later. However, in general, by providing an additional accumulator for each extraordinary payment path it is still possible to verify the system integrity as will be explained.

Figure 6:
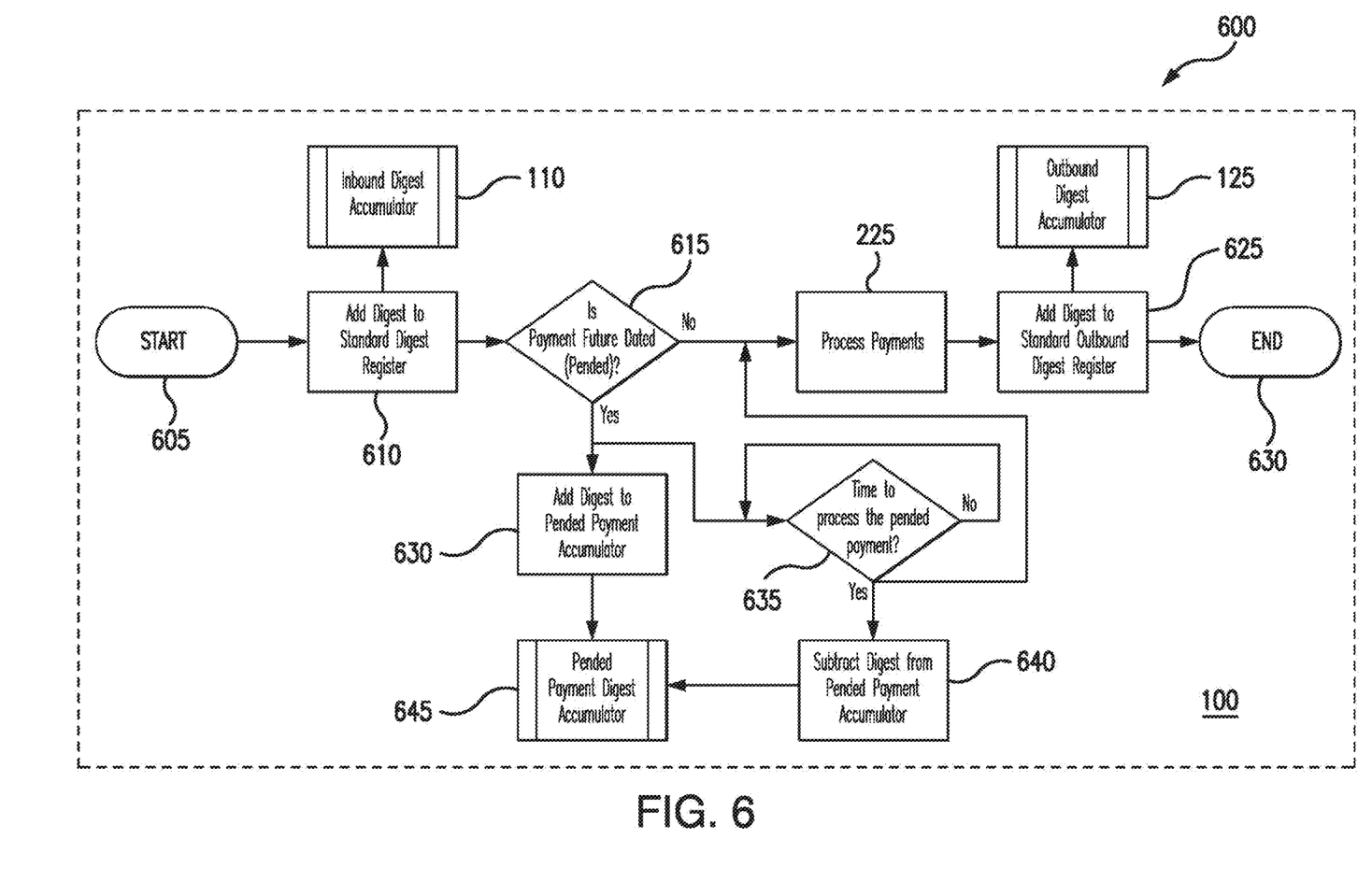
FIG. 6 describes an apparatus of FIG. 1 that allows for pended payments.

FIG. 6 shows the apparatus 100 shown in FIG. 2 that is adapted to handle pended or future dated payments. Like reference numerals refer to like features and so will not be explained in any further detail.

The process 600 in the apparatus 100 will be carried out by the processing circuitry 105 and starts at step 605 when an input message digest 240 is obtained by the apparatus 100. The process moves to step 610 where the input message digest is added to the input accumulator 110. Although not shown, the arrival of the input message digest is added to the input counter 115. This is the same as FIG. 2. However, a check is then carried out in step 615 by the processing circuitry 105 to determine if the payment instruction in the source electronic message is a future dated (sometimes called a "pended") payment. This will be achieved by the processing circuitry 105 obtaining this information from the processing device 225. This is possible because at this point, before the hash is applied, the input to the hash function is still available for conditional processing. Alternatively, the source electronic message may be provided to the apparatus 100 with the input message digest.

In the event that the payment instruction is future dated, the "yes" path is followed to step 630 where the input message digest is added to a pended payment accumulator 645. This has the same construction as both the input accumulator 110 and the output accumulator 125 and so will not be described in any further detail.

In addition, if the "yes" path is followed at step 615, the process moves to step 635 where a check is made by the processing circuitry 105 to determine if the time to process the pended payment has expired. In the event that the time to process has not expired (i.e. the pended payment is not yet to be processed), the "no" path is followed and effectively the process waits.

At this stage, if a check is made on the system verification, the processing circuitry 105 will check the input accumulator 110 which includes the message digest, the output accumulator 125 which does not include the message digest, and the pended payment accumulator 645 which contains the message digest. Therefore, the sum of the output accumulator 125 and the pended payment accumulator 645 is equal to the input accumulator 110 when system integrity exists.

Once the time to process the pended payment has expired, the "yes" path from step 635 is followed. The process then moves to step 640, where the message digest is removed from the pended payment accumulator 645. At the same time, the process then releases the payment to be processed by the processing device 225. The process then proceeds as in FIG. 2, where the destination electronic message has a digest obtained (in step 625) and the output message digest is added to the output accumulator 125.

During this time, if a check is made on the system integrity, the processing circuitry 105 will check the input accumulator 110 which includes the message digest, the output accumulator 125 which now includes the message digest, and the pended payment accumulator 645 which now does not contain the message digest. Therefore, the sum of the output accumulator 125 and the pended payment accumulator 645 is equal to the input accumulator 110 when system integrity exists.

The process ends at step 650.

Figure 7:
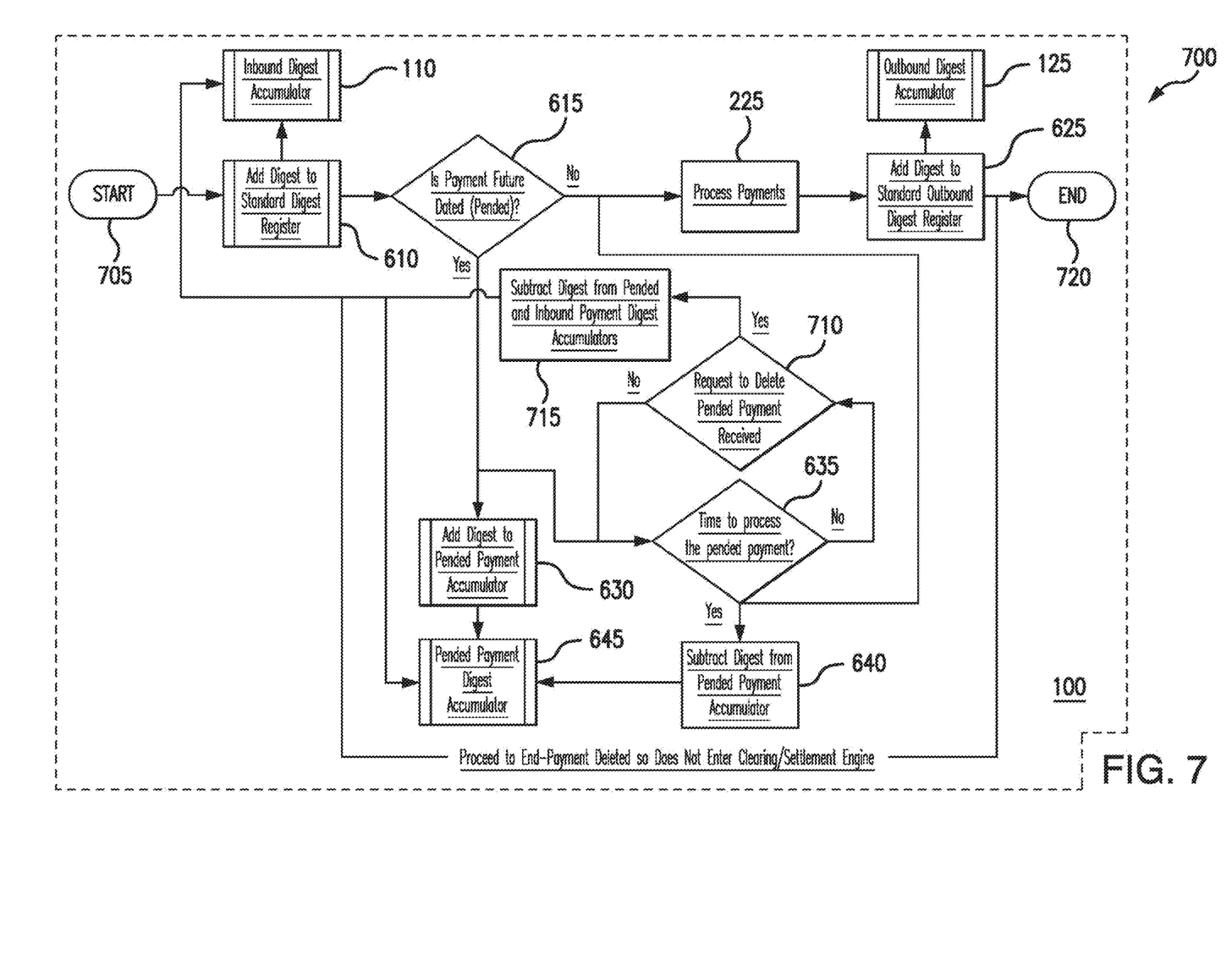
FIG. 7 describes an apparatus of FIG. 6 that allows deletion of the pended payments.

Referring to FIG. 7, an embodiment is shown which allows for the pended payments of FIG. 6 to be deleted. Accordingly, FIG. 7 is based on FIG. 6 where like reference numerals refer to like features which will not be explained in any further detail for brevity.

In the scenario of deleting a pended payment, an adjustment needs to be made to the pended payment accumulator 645 and the input accumulator 110 to remove reference to the pended payment which is to be deleted. It is not necessary to adjust the output accumulator 125 because the pended payment is only added to the output accumulator 125 once the pended payment has been processed by the processing device 225. However, the payment is deleted before this time.

Referring to FIG. 7, the process 700 starts at step 705 with the apparatus 100 receiving an input message digest. The process of FIG. 6 is then followed. However, in FIG. 7 an additional step of checking whether the pended payment is to be deleted is inserted in the "no" path following step 635. Specifically, whilst the process is waiting for the time to process the pended payment to expire, a check is made to see if a request to delete the pended payment is received from a bank or other financial institution. This is step 710. If no request is received to delete the pended payment, the "no" path is followed and the process of FIG. 6 continues.

However, in the event that a request is received to delete the pended payment, the "yes" path is followed from step 710. The process moves to step 715. In step 715, the message digest is removed from both the input accumulator 110 and the pended payment accumulator 645. The process then proceeds to step 720 where the process ends.

It should be noted that if deletions of payments in flight are supported by a payment, then the adjustments to the pended payment accumulator 645 (if applicable) will already have been made as the payment enters clearing and settlement. In this instance, the subtraction needs to come only from the input accumulator 110 as the message digest will never reach the output accumulator 125.

Figure 8:
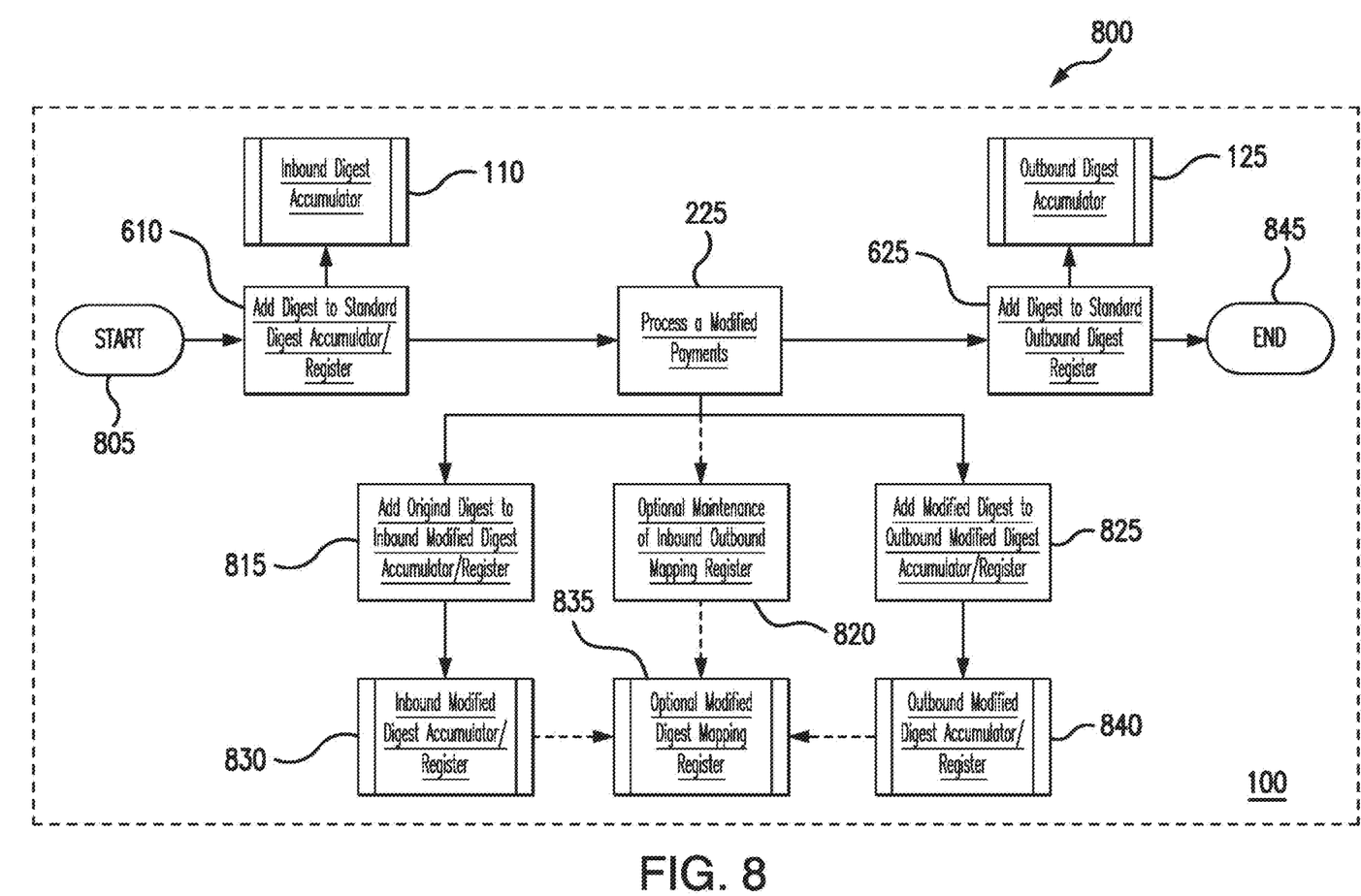
FIG. 8 describes an apparatus according to embodiments that allows for modification of the source electronic message.

In FIG. 8, a further embodiment is shown explaining the processing of payment redirections/amendments/corrections to payment instructions. This is based on FIG. 2 where like features have like reference numerals.

The process 800 starts at step 805 where a input message digest is obtained by the apparatus 100. The input message digest is added to the input accumulator 110 in step 610 and to the output accumulator 125 in step 625.

The payment instruction within the source electronic message is then processed by the processing device 225. During this process, the payment instruction (and so the source electronic message) is modified in some way.

In the event that the payment instruction is modified, a message digest of the modified source electronic message is obtained. The digest will be created as explained above with reference to FIG. 2. The message digest of the modified source electronic message will be added to an input modified digest accumulator 830. This addition process takes place in step 815.

In addition, the modified destination electronic message has an output message digest produced. The message digest of the modified destination electronic message will be added to an output modified digest accumulator 840. This addition process takes place in step 825.

If a check is made by the processing circuitry 105 of system integrity, when the value of the input accumulator 110 minus the input modified digest accumulator 830 is equal (or is equivalent to) the output accumulator 125 minus the output modified digest accumulator 840, system integrity exists.

In order to more easily identify failures, a mapping register 835 may be included. In this instance, the mapping register 835 may include a copy of the input modified digest and a copy of the output modified digest. This is similar to the registers in FIG. 5 and the matching function in FIG. 5 is shown in FIG. 8 as step 820.

Two further mechanisms may be used to handle payment redirections, amendments or corrections.

In the first method, the processing device adds a balancing dummy entry to the output accumulator to balance the original entry and then manually creates a new source electronic message and new destination electronic message which are provided to step 240 and 270 of FIG. 2 respectively.

In the second method, the processing device deletes the message digest associated with the source electronic message that has been modified from the input accumulator 110 and then manually creates a new source electronic message and new destination electronic message which are provided to step 240 and 270 of FIG. 2 respectively.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the disclosure may be generally defined by the following numbered clauses:

Clause 1. A method for verifying integrity of electronic messages, comprising the steps of:
obtaining an input message digest for a source electronic message;
adding the input message digest to an input accumulator that accumulates the input message digests over a predetermined period of time;
obtaining an output message digest for a destination electronic message;
adding the output message digest to an output accumulator that accumulates the output message digests over the predetermined period of time;
comparing the value of the input accumulator with the value of the output accumulator at the expiration of the predetermined period of time; and
verifying integrity in the source and destination electronic messages over the predetermined period of time when the value of the input accumulator is equivalent to the value of the output accumulator.

Clause 2. A method according to clause 1, comprising:
counting the number of input message digests obtained over the predetermined period of time;
counting the number of output message digests obtained over the predetermined period of time;
comparing the number of input message digests with the number of output message digests at the expiration of the predetermined period of time; and
verifying no loss of source electronic messages occurred over the predetermined period of time when the number of input message digests is equal to the number of output message digests.

Clause 3. A method according to either clause 1 or 2, wherein probability of the input message digest and the output message digest colliding is substantially zero.

Clause 4. A method according to any one of clause 1, 2 or 3, wherein the source electronic message and the destination electronic message include the same identifier.

Clause 5. A method according to any one of clause 1 to 4, wherein the source electronic message and the destination electronic message are one of a payment instruction or a payment instruction in a batch file.

Clause 6. A method according to any one of the preceding clauses, further comprising:
storing the input message digest and the output message digest;
matching the input message digest with the output message digest; and
highlighting one of the input message digest or the output message in the event that there is no corresponding match.

Clause 7. A method according to any preceding clause, wherein in the event that the output message digest will be obtained after the expiration of the predetermined period of time, the method further comprises:
adding the input message digest to a further accumulator; and
verifying integrity when the value of the input accumulator is equivalent to the sum of the value of the output accumulator and the further accumulator.

Clause 8. A computer program product comprising computer readable instructions which, when loaded onto a computer, configure the computer to perform a method according to any preceding clauses.

Clause 9. An apparatus for verifying integrity of electronic messages, comprising control circuitry configured to:
obtain an input message digest for a source electronic message;
add the input message digest to an input accumulator that accumulates the input message digests over a predetermined period of time;
obtain an output message digest for a destination electronic message;
add the output message digest to an output accumulator that accumulates the output message digests over the predetermined period of time;
compare the value of the input accumulator with the value of the output accumulator at the expiration of the predetermined period of time; and
verify integrity in the source and destination electronic messages over the predetermined period of time when the value of the input accumulator is equivalent to the value of the output accumulator.

Clause 10. An apparatus according to clause 9, wherein the control circuitry is configured to:
count the number of input message digests obtained over the predetermined period of time;
count the number of output message digests obtained over the predetermined period of time;
compare the number of input message digests with the number of output message digests at the expiration of the predetermined period of time; and
verify no loss of source electronic messages occurred over the predetermined period of time when the number of input message digests is equal to the number of output message digests.

Clause 11. An apparatus according to either clause 9 or 10, wherein probability of the input message digest and the output message digest colliding is substantially zero.

Clause 12. An apparatus according to any one of clauses 9, 10 or 11, wherein the source electronic message and the destination electronic message include the same identifier.

Clause 13. An apparatus according to any one of clauses 9 to 12, wherein the source electronic message and the destination electronic message are one of a payment instruction or a payment instruction in a batch file.

Clause 14. An apparatus according to any one of clauses 9 to 13, further comprising:
a store configured to store the input message digest and the output message digest; and
the control circuitry is further configured to:
match the input message digest with the output message digest; and
highlight one of the input message digest or the output message in the event that there is no corresponding match.

Clause 15. An apparatus according to any one of clauses 9 to 14, wherein in the event that the output message digest will be obtained after the expiration of the predetermined period of time, the control circuitry is further configured to:
add the input message digest to a further accumulator; and
verify integrity when the value of the input accumulator is equivalent to the sum of the value of the output accumulator and the further accumulator.

What is claimed is:

1. A method for verifying integrity of electronic messages, comprising the steps of:
    applying a hash function, via a processor, to generate an input message digest for each source electronic message of a plurality of source electronic messages received over a predetermined period of time;
    adding each input message digest to an input accumulator that sums the input message digest for each source electronic message of the plurality of source electronic messages into a single source value over the predetermined period of time;
    applying the hash function, via the processor, to generate an output message digest for each destination electronic message of a plurality of destination electronic messages received over the predetermined period of time;
    adding each output message digest to an output accumulator that sums the output message digest for each destination electronic message of the plurality of destination electronic messages into a single destination value over the predetermined period of time;
    comparing, via the processor, the single source value of the input accumulator with the single destination value of the output accumulator at an expiration of the predetermined period of time; and
    verifying integrity in the plurality of source and destination electronic messages over the predetermined period of time when the single source value of the input accumulator is equivalent to the single destination value of the output accumulator.

2. A method according to claim 1, comprising:
    counting a total number of input message digests corresponding to the plurality of source electronic messages received over the predetermined period of time;
    counting a total number of output message digests corresponding to the plurality of destination electronic messages received over the predetermined period of time;
    comparing the total number of input message digests corresponding to the plurality of source electronic messages received with the total number of output message digests corresponding to the plurality of destination electronic messages received at the expiration of the predetermined period of time; and
    verifying no loss of source electronic messages occurred over the predetermined period of time when the total number of input message digests corresponding to the plurality of source electronic messages received is equal to the total number of output message digests corresponding to the plurality of destination electronic messages received.

3. A method according to claim 1, wherein probability of the input message digest and the output message digest colliding is substantially zero.

4. A method according to claim 1, wherein the each source electronic message and the each destination electronic message include corresponding equivalent identifiers.

5. A method according to claim 1, wherein the each source electronic message and the each destination electronic message are one of a payment instruction or a payment instruction in a batch file.

6. A method according to claim 1, further comprising:
    storing the input message digest and the output message digest;
    matching the input message digest with the output message digest; and
    highlighting one of the input message digest or the output message digest in an event that there is no corresponding match.

7. A method according to claim 1, wherein in the event that the output message digest will be obtained after the expiration of the predetermined period of time, the method further comprises:
    adding the input message digest to a further accumulator; and
    verifying integrity when the value of the input accumulator is equivalent to a sum of the value of the output accumulator and the further accumulator.

8. A non-transitory computer-readable storage medium comprising computer readable instructions which, when loaded onto a computer, configure the computer to perform a method comprising:
    applying a hash function, via a processor, to generate an input message digest for each source electronic message of a plurality of source electronic messages received over a predetermined period of time;
    adding each input message digest to an input accumulator that sums the input message digest for each source electronic message of the plurality of source electronic messages into a single source value over the predetermined period of time;
    applying the hash function, via the processor, to generate an output message digest for each destination electronic message of a plurality of destination electronic messages received over the predetermined period of time;
    adding each output message digest to an output accumulator that sums the output message digest for each destination electronic message of the plurality of destination electronic messages into a single destination value over the predetermined period of time; comparing, via the processor, the single source value of the input accumulator with the single destination value of the output accumulator at an expiration of the predetermined period of time; and
    verifying integrity in the plurality of source and destination electronic messages over the predetermined period of time when the single source value of the input accumulator is equivalent to the single destination value of the output accumulator.

9. An apparatus for verifying integrity of electronic messages, comprising control circuitry configured to:
    apply a hash function to generate an input message digest for each source electronic message of a plurality of source electronic messages received over a predetermined period of time;
    add each input message digest to an input accumulator that sums the input message digest for each source electronic message of the plurality of source electronic messages into a single source value over the predetermined period of time;

apply the hash function to generate an output message digest for each destination electronic message of a plurality of destination electronic messages received over the predetermined period of time;

add each output message digest to an output accumulator that sums the output message digest for each destination electronic message of the plurality of destination electronic messages into a single destination value over the predetermined period of time;

compare the single source value of the input accumulator with the single destination value of the output accumulator at an expiration of the predetermined period of time; and verify integrity in the plurality of source and destination electronic messages over the predetermined period of time when the single source value of the input accumulator is equivalent to the single destination value of the output accumulator.

10. An apparatus according to claim 9, wherein the control circuitry is configured to:

count a total number of input message digests corresponding to the plurality of source electronic messages received over the predetermined period of time;

count a total number of output message digests corresponding to the plurality of destination electronic messages received over the predetermined period of time;

compare the total number of input message digests corresponding to the plurality of source electronic messages received with the total number of output message digests corresponding to the plurality of destination electronic messages received at the expiration of the predetermined period of time; and verify no loss of source electronic messages occurred over the predetermined period of time when the total number of input message digests corresponding to the plurality of source electronic messages received is equal to the total number of output message digests corresponding to the plurality of destination electronic messages received.

11. An apparatus according to claim 9, wherein probability of the input message digest and the output message digest colliding is substantially zero.

12. An apparatus according to claim 9, wherein the each source electronic message and the each destination electronic message include corresponding equivalent identifiers.

13. An apparatus according to claim 9, wherein the each source electronic message and the each destination electronic message are one of a payment instruction or a payment instruction in a batch file.

14. An apparatus according to claim 9, further comprising:

a storage configured to store the input message digest and the output message digest; and the control circuitry is further configured to:

match the input message digest with the output message digest; and highlight one of the input message digest or the output message digest in an event that there is no corresponding match.

15. An apparatus according claim 9, wherein in the event that the output message digest will be obtained after the expiration of the predetermined period of time, the control circuitry is further configured to:

add the input message digest to a further accumulator; and verify integrity when the value of the input accumulator is equivalent to a sum of the value of the output accumulator and the further accumulator.

\* \* \* \* \*